Patented Dec. 9, 1924.

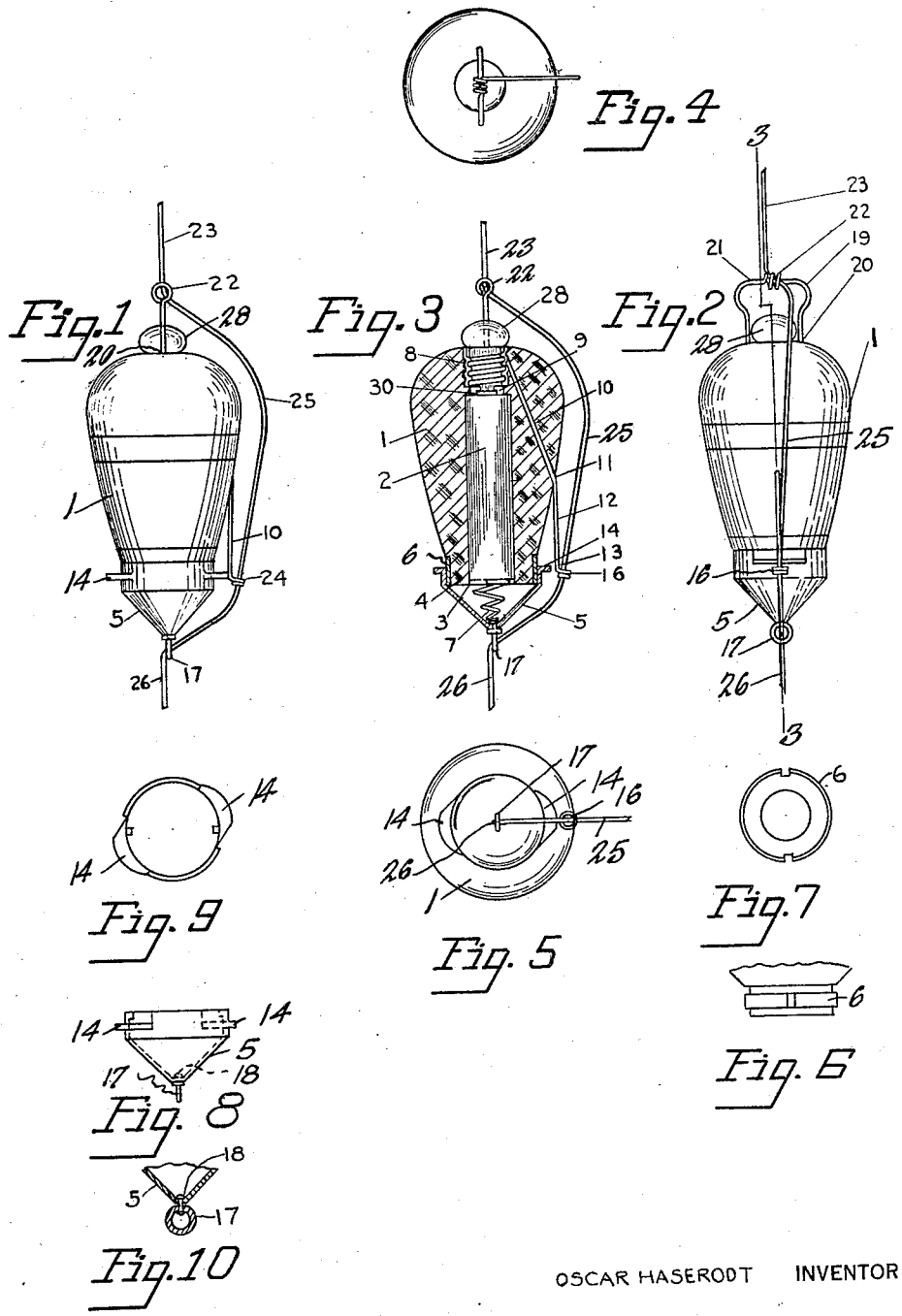

1,518,425

UNITED STATES PATENT OFFICE.

OSCAR HASERODT, OF ELYRIA, OHIO.

ELECTRICAL FISHLINE FLOAT.

Continuation of application Serial No. 541,963, filed March 8, 1922. This application filed May 28, 1922. Serial No. 642,122.

*To all whom it may concern:*

Be it known that I, OSCAR HASERODT, a citizen of the United States, residing at Elyria, in the county of Lorain and State of Ohio, have invented certain new and useful Improvements in Electrical Fishline Floats, of which the following is a full, clear, concise, and exact description, as will enable others skilled in the art to which my invention appertains to make and use the same.

My invention relates to electrical fish line floats, and more particularly to such floats as contain a signal lamp or equivalent electro responsive device adapted to be operated from a source of current carried by the float such as a battery cell, the said float carrying the said cell and the said device, and an electric switch operable by the pull of a fish on the hook end of the line to operate the signal.

This application is a continuation of my application Serial No. 541,963, filed March 8, 1922, abandoned by a letter of abandonment of May 29, 1923, and discloses moreover certain improvements over the apparatus disclosed and claimed in the aforesaid application.

It is an object of my present invention to provide a fish line float which will rest on the surface of the water, but which may be drawn below the surface of the water by the pull of a fish on the hook end of the line, but which, when such pull is exerted by the fish, will operate the signal.

Another object of my invention is to provide a battery cell carried by the float, said cell insertable therein from the bottom of the float and being retained in position by a cap which not only makes a closure of the bottom end of the float, but also electrically makes connection between the battery cell in the float and the electrical switch disposed on the outside thereof.

Another object of my invention is to provide such a cap or other element, adjustable to cause the switch to operate the signal device on pulls of different strength, thereby making the float adaptable for fishing for different sized fish, in rough or smooth water.

Another object of my invention is to provide improved means for operatively associating the fish line with the fish line float.

Other objects of my invention and the invention itself will be better understood by reference to the following description, and in which description reference is had to the accompanying drawing showing a preferred embodiment of my invention.

Referring to the drawing—

Fig. 1 shows a side elevational view of an embodiment of my invention.

Fig. 2 shows a side elevational view of the said embodiment taken at right angles to the view of Fig. 1.

Fig. 3 shows a longitudinal sectional view of the float illustrated in Figs. 1 and 2 taken on the line 3—3 of Fig. 1.

Fig. 4 shows a top plan view of the said embodiment.

Fig. 5 shows a bottom plan view thereof.

Fig. 6 shows a side elevational view of the lower end of the fish float end with the cap removed showing a metallic ferrule placed over the end of the float.

Fig. 7 shows a bottom plan view of the bottom end only of the fish line float illustrated in Fig. 6.

Fig. 8 shows a side elevational view of the bottom end cap of the float.

Fig. 9 shows a top plan view of the end cap shown in Fig. 8.

Fig. 10 shows an enlarged vertical medial cross-sectional view of the bottom end of the end cap shown in the foregoing figures to illustrate the method of connecting the swiveling eyelet through which the fish line float passes, and which is supported on the lower end of the cap.

Referring now to all of the figures in which like parts are indicated by like reference characters, at 1, I show the body of the float which preferably is constructed of cork or like buoyant material, and at 2 I show a cylindrical electrical dry cell of battery, the said cell being insertable through an opening 3 in the bottom end 4 of the float body 1, said cell being retained in position within the float body cylindrical recess provided for it by a retaining closure cap 5 carried on the end of the float body; said cap being retained thereon by frictional spring contact with the periphery of a brass ferrule 6, and which brass ferrule fits tightly over the outside of the end of the float body 1.

The cell 2 is pressed upwardly by a spiral compression spring 7 having preferably its lower convolutions of continually less diameter so as to fit centrally in the conical cap 5, and to make electrical connection between the bottom wall of the cell 2 and the said cap.

In the upper portion of the float, a spirally corrugated lamp receiving socket is provided consisting of the tubular brass member 8 which fits snugly within the inner wall of a reduced extension 9 of the cylindrical opening 3 provided to receive the battery cell 2, and which extension extends from the battery cell to the top of the float, a connecting wire 10 is electrically united, as by soldering with the socket 8 and extends through the float body 1 downwardly, and outwardly emerging from the float body at 11, there being a substantial length 12 of the wire 10 between the point 11 and a point 13 in the said wire, and at which point 13, the spring 10 is adapted to contact with a laterally extending flange 14 of the cap 5, such flange being shaped substantially as shown in the figures, reference being had particularly to Figs. 5, 8 and 9, so that when the cap 5 is rotated the edge of the flange 14 next adjacent the portion 13 of the wire 10, which is preferably of spring material, will approach or recede from the wire 10 at such portion thereof, and adjustment is thereby provided for the electrical switch comprising the switch contact elements provided by the flange 14 and the wire portion 13 to regulate the distance between said elements, whereby different amounts of pressure on the wire end 16 in an inward direction will serve to bring the elements 13 and 14 into mechanical contact to produce an electrical connection.

The end of the cap 5 supports a swiveling eyelet 17 by means of a loosely fitting pin 18, the said pin being headed at both ends, and having its intermediate neck portion passing through perforations in adjacent walls of the eyelet ring 17 and the cap end so that the ring 17 may swivel on the pin 18 freely in all directions about a longitudinal axis. A line contacting wire 19 is provided for the top of the float being secured at either end 20 and 21 in the float body, either as illustrated by soldering to the socket 8, or by embedding the arms 20 and 21 in the material of float body 1. The wire member 19 is coiled at an intermediate portion 22 so that the fish line 23 may pass through one or more turns of the coil and emerge between coils, the coils being so closely put together as to frictionally grip the line 23.

The line 23 passes through coils 24 on the end of the wire 10 making also, preferably, frictional contact with the wire 10 at the coils 24 thereof. In practice the line 23 will be frictionally secured by the coils 22 at the top of the float and the coils 24 secured to the wire 10, and there will be an intermediate line portion 25, extending loosely, with some slack therein between these coils.

The line 23 also passes through the swiveling ring eyelet 17 which will freely rotate to accommodate the line 23, and particularly the hook carrying end 26 thereof, which may, by the pull of a fish, be carried in various directions. When the fish pulls on the hook end 26 of the line 23, the frictional contact had between the coiled portion 24 of the wire 10 and the line 23, will cause the wire 10 to be deflected against the power of its own resiliency, inwardly, until a contact is made between adjacent portions 13 of the wire 10 and the flange 14 on the cap 5, this contact will close a circuit including the signal lamp 28, the battery cell 2, the said circuit comprising also the compression spring 7, the cap 5, the wire 10, and the flange 14, and current will flow over this circuit from battery cell 2, and the lamp 28 will prominently display a signal, even though the float 1 be drawn below the surface of the water, the lamp 28 remaining lighted and showing its signal from below the surface of the water, and apprising the fisherman of the fact that a fish has become caught on the hook carried by the line 23, whereupon the fisherman, in the usual way, will pull in his line, and the fish at its end.

It will be noted that in the embodiment of my invention as illustrated, only a small portion of the electrical circuit conducting elements connected to the pole 30 of the battery cell 2, are exposed to the action of the water, and inasmuch as water has a very considerable electrical resistance, and in effect is actually an insulator for such low voltages as herein employed, of considerable insulating properties, that no considerable flow will pass between the poles of the battery, and that, therefore, the electrical float of my invention may be left in the water for considerable periods of time without discharging the battery cell to an appreciable degree; also the cap 5 is so easily removable from the end of the float body that the cell 2 may be removed after a fishing expedition, and dried and put on the shelf when not in use.

It will be noted also that my improved electrical float may be used quite conveniently as a search light as when baiting hooks, when fishing at night, as being of small size and operable by squeezing pressure from the palm of the hand, the fingers of the hand in which it is held are left free for manipulating the hook and bait.

Having thus described my invention in a specific embodiment, I am aware that nu- merous and extensive departures may be made from the specific form of the apparatus herein set forth, but without departing from the spirit of my invention, I claim as my invention—

1. A fish line float, carrying an electric lamp and a battery, said float being adapted to be pulled under the surface of the water by the pull of a fish on the end of the line, means made operative by such a pull for completing the circuit from said battery to said lamp, and means carried by the said float rotatably adjustable for varying the responsiveness of the said means.

2. In a fish line float, the combination with a float body member, a recess within the said member adapted to receive an electric battery cell, a lamp adapted to be placed on the said float, an electric switch, operating means therefor comprising a deflectable spring adapted to be deflected by a pull on the fish line, said switch when operated completing a circuit for the said lamp including the said cell, and means rotatably adjustable adapted to vary the responsiveness of the said operating means.

3. In a fish line float, the combination with a fish line, a float body having a substantially cylindrical recess extending longitudinally through the body, the upper portion of the passage being of reduced diameter to form a lamp socket, a signal lamp for the said socket and adapted to be secured therein, a cylindrical battery adapted to be placed within the said recess, a removable cover for the lower portion of said recess, and an electrical contact element responsive to a pull upon the said fish line to close an energizing circuit for the said lamp, said circuit including the said battery, and adjustable means carried by the said cover for varying the responsiveness of the said contact element.

4. In a fish line float, an electric lamp mounted on the float, a solid cylindrical battery insertable within the float, and an electrical contact element for completing a circuit including the said lamp and the said battery, said contact element having a movable member disposed on the outside of the said float and secured thereto, and a removable cover adapted to permit removal of the said battery without disturbing the lamp mounting, and adjustable means carried by the said cover for varying the responsiveness of the said contact element.

5. In a fish line float, the combination with a fish line, a float body, having a substantially cylindrical recess extending longitudinally through the body, the upper portion of the passage being of reduced diameter to form a lamp socket, a signal lamp for the said socket and adapted to be secured therein, a cylindrical battery adapted to be placed within the said recess, a removable cover for the lower portion of the said recess, and an electrical contact element responsive to a pull upon the said fish line to close an energizing circuit for the said lamp, said circuit including the said battery, a flange for the said cover extending laterally therefrom, said cover being rotatable to cause the said flange to take different operative positions relative to the said contact element, said contact element adapted to be responsive to different pull strengths according to the position of the said flange relative to the said element.

6. A fish line float, a lamp, a battery cell, an electrical switch, said lamp cell and switch being carried by the said float, circuit connections extending between the said lamp cell and switch, normally open contacts in the said switch, means responsive to a pull on the hook end of the fish line to close the said contacts to cause the said lamp to be lighted by electric current from the said battery, one of the said contacts being a movable contact, and the other contact being a stationary contact, and means to adjust the said stationary contact relative to the said movable contact.

7. In a fish line float, a buoyant float body, a longitudinally extending recess in the said body, a battery cell insertable in the said recess, a cover for the opening of the recess at one end of the float body, a signal lamp on the float, an electric switch adapted to interconnect the said cell and lamp to operate the lamp, stationary and movable contacts for the said switch, means to connect the movable contact of the said switch to the lower end of the fish line whereby the switch may be operated by a pull on the line lowered end, and means secured to the fish line float body for adjusting the stationary switch contact toward or away from the said movable contact thereof.

8. In a fish line float, a float body comprising buoyant float material, an electric lamp, a battery cell, a recess extending from the lower end of the said body and longitudinally therein adapted to receive the said cell, a cover for the recess mouth, a metallic band over the end of the said float body outer wall adjacent the said recess, said cover being maintained in position by frictional contact with the said band, an electrical switch, circuit connections extending between said switch, cell and lamp, whereby when said switch is operated said lamp will be energized by current from the said battery cell, said switch comprising a pair of normally separated contacts, one of said contacts being a movable contact, and connections between a fish line and the said movable contact whereby a pull on the said line will move the said contact to close the said switch contacts.

9. In a fish line float, a float body comprising buoyant float material, an electric lamp, a battery cell, a recess extending from the lower end of the said body and longitudinally therein adapted to receive the said cell, a cover for the recess mouth, a metallic band over the end of the said float body outer wall adjacent the said recess, said cover being maintained in position by frictional contact with the said band, an electrical switch, circuit connections extending between said switch, cell and lamp, whereby when said switch is operated said lamp will be energized by current from the said battery cell, said switch comprising a pair of normally separated contacts, one of said contacts being a movable contact, and connections between a fish line and the said movable contact whereby a pull on the said line will move the said contact to close the said switch contacts, and adjusting means for the said stationary contact carried by the said cover.

10. In a fish line float, a float body comprising buoyant float material, an electric lamp, a battery cell, a recess extending from the lower end of the said body and longitudinally therein adapted to receive the said cell, a cover for the recess mouth, a metallic band over the end of the said float body outer wall adjacent the said recess, said cover being maintained in position by frictional contact with the said band, an electrical switch, circuit connections extending between said switch, cell and lamp, whereby when said switch is operated said lamp will be energized by current from the said battery cell, said switch comprising a pair of normally separated contacts, one of said contacts being a movable contact, and connections between a fish line and the said movable contact whereby a pull on the said line will move the said contact to close the said switch contacts, and means to vary the responsiveness of the said switch to close its contacts by a pull on the line, comprising adjusting means carried by the said float body.

11. In a fish line float, the combination with a fish line, a float body, having a substantially cylindrical recess extending longitudinally through the body, the upper portion of the passage being of reduced diameter to form a lamp socket, a signal lamp for the said socket and adapted to be secured therein, a cylindrical battery adapted to be placed within the said recess, a removable cover for the lower portion of said recess, an electrical switch, a movable contact element for the said switch, a stationary contact element therefor, said movable element being responsive to a pull upon the fish line to engage with said stationary element, said stationary element being adjustable toward and from said movable element.

12. In a fish line float, the combination with a fish line, a float body, having a substantially cylindrical recess extending longitudinally through the body, the upper portion of the passage being of reduced diameter to form a lamp socket, a signal lamp for the said socket and adapted to be secured therein, a cylindrical battery adapted to be placed within the said recess, a removable cover for the lower portion of said recess, an electrical switch carried by the said body, said switch comprising a pair of contacts adapted to be closed by a pull on the fish line, a pair of flanges extending laterally from the said cover, said cover being rotatable to cause the said flanges to be moved to adjustably vary the responsiveness of the said switch.

13. In a fish line float, the combination with a float body member, an electric lamp, an electric battery cell, and a controlling switch carried by the said member, a movable contact for the said switch, a stationary contact therefor, said fish line having its hook end secured to the said movable contact, the other end of the line extending upwardly from the float being secured to an upper portion thereof, and adjusting means secured to the float body adapted to vary the normal distance between the said contacts.

14. A signaling fishing float comprising a buoyant float body having an electric cell disposed therein, an electric signal lamp in circuit with said cell, and a switch for making and breaking the circuit between said cell and said lamp, said switch being disposed entirely exteriorly of the float body and being adapted for operation by a pull on the fishing line to which the float is secured.

15. A signaling fishing float comprising a buoyant float body having an electric cell disposed therein, an electric signal device in circuit with said cell, and a switch for making and breaking the circuit between said cell and said device, said switch being disposed entirely exteriorly of the float body and being adapted for operation by a pull on the fishing line to which the float is secured.

In witness whereof, I have hereunto signed my name this 25th day of May, 1923.

OSCAR HASERODT.